(12) United States Patent
Sedal et al.

(10) Patent No.: US 11,255,356 B2
(45) Date of Patent: Feb. 22, 2022

(54) FLUIDIC ACTUATOR SYSTEM USING AUXETIC BEAM REINFORCEMENTS

(71) Applicant: THE REGENTS OF THE UNIVERSITY OF MICHIGAN, Ann Arbor, MI (US)

(72) Inventors: Audrey Sedal, Ann Arbor, MI (US); Joshua Bishop-Moser, Ann Arbor, MI (US); Sridhar Kota, Ann Arbor, MI (US); Michael Fisher, Middletown, DE (US); Margaret Kohler, Farmington, MI (US); Alan Wineman, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 17/007,482

(22) Filed: Aug. 31, 2020

(65) Prior Publication Data

US 2021/0095700 A1    Apr. 1, 2021

Related U.S. Application Data

(60) Provisional application No. 62/906,381, filed on Sep. 26, 2019.

(51) Int. Cl.
*F15B 15/10* (2006.01)
*F03G 7/06* (2006.01)

(52) U.S. Cl.
CPC .............. *F15B 15/10* (2013.01); *F03G 7/065* (2013.01)

(58) Field of Classification Search
CPC .......... F15B 15/10; F15B 15/103; F03G 7/065
See application file for complete search history.

(56) References Cited

U.S. PATENT DOCUMENTS

| | | | |
|---|---|---|---|
| 7,910,193 B2 | 3/2011 | Ma | |
| 8,302,696 B2 | 11/2012 | Williams et al. | |
| 2006/0129227 A1 | 6/2006 | Hengelmolen | |
| 2011/0029063 A1* | 2/2011 | Ma | A61F 2/915 623/1.16 |
| 2013/0322955 A1 | 12/2013 | Ma | |
| 2018/0311833 A1 | 11/2018 | Lipton et al. | |

OTHER PUBLICATIONS

Lazarus, Soft Actuation of Structured Cylinders through Auxetic Behavior, Advanced Engineering Materials, Wiley-VCH Verlag, 2015, 17 (6), pp. 815-820.*

* cited by examiner

*Primary Examiner* — Abi Y Teka
*Assistant Examiner* — Daniel S Collins
(74) *Attorney, Agent, or Firm* — Harness, Dickey & Pierce, P.L.C.

(57) ABSTRACT

An actuator system is provided having a fluidic body member having a surface configured to be deformable in response to a pressure differential. One or more auxetic elements are disposed on and engage the surface of the fluidic body member in the form of a network of beam elements. The auxetic element has a negative Poisson's ratio resulting in kinematics such that upon application of the internal fluid pressure, the surface of the fluidic body member is caused to have specific kinematics enabling planar and 3D motions. In some embodiments, the plurality of non-auxetic elements cooperate with a plurality of auxetic elements.

18 Claims, 11 Drawing Sheets

Fig-1

$\theta = \frac{5}{6}\pi$  $\theta = \pi/2$  $\theta = 0$

Sequential Actuators can Perform Sequential Tasks

FLUIDIC ACTUATOR SYSTEM USING AUXETIC BEAM REINFORCEMENTS

CROSS-REFERENCE TO RELATED APPLICATIONS

This application claims the benefit of U.S. Provisional Application No. 62/906,381, filed on Sep. 26, 2019. The entire disclosure of the above application is incorporated herein by reference.

FIELD

The present disclosure relates to fluidic actuator systems and, more particularly, relates to fluid actuators using auxetic beam reinforcements.

BACKGROUND AND SUMMARY

This section provides background information related to the present disclosure which is not necessarily prior art. This section provides a general summary of the disclosure, and is not a comprehensive disclosure of its full scope or all of its features.

Pneumatic actuators can be particularly useful in soft robotic applications due to their flexibility under loading, and physical adaptability. Pneumatically actuated soft robots have demonstrated capabilities in biomimetic locomotion, assistive wearable devices, and manipulators. Reinforced soft actuators can enable soft robots to create sophisticated motions and loading, including axial extension, rotation, and torsion.

Soft fluidic robots have the inherent ability to interact safely across several loci within their environments. These interactions have been applied in exo-suits and haptic devices, in-home assistance, surgery, pipe inspection, and motion through continuum media, such as water or dirt. Desired motions and shapes are often generated by a reinforcing layer of fibers adhered to the actuator, shape memory alloys, braided sleeves placed on the actuator's outer surface, or thicker or stiffer materials placed on the actuator. While these methods have created an array of useful kinematics, there are numerous tasks and applications that would be enabled or greatly improved through a novel reinforcement system with enhanced functionality and increased design degrees of freedom. Examples include robots in continuum environments, where control over both diameter and length of the entirety of the actuator are critical for functionality, or anchoring and grasping applications, where actuator shape may change over its length or circumference as the robot interacts with the environment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In some embodiments according to the principles of the present teachings, as illustrated in FIGS. 1-12, a fluidic actuator system 10 is provided having at least one fluidic body member 12 that is deformable in response to a pressure differential existing between an internal pressure within an internal volume 16 and an external pressure outside of the fluidic body member 12. This pressure differential results in actuation and/or deformation of the fluidic body member 12 between a first configuration (i.e. size and/or shape) and a second configuration (i.e. size and/or shape) in accordance with the present teachings. It should be understood that any pressure differential sufficient to actuate fluidic body member 12 between the first configuration and the second configuration can be used.

As will be discussed herein, this pressure differential can be achieved in any number of ways, including but not limited to introduction of pressurized fluid within internal volume 16; creation of a vacuum or reduced pressure within internal volume 16 or external to fluidic body member 12; modification of external pressure forces in response to application of work, change of elevation or altitude, change of barometric or hydraulic pressure; and the like. Any action resulting in a pressure differential acting on fluidic body member 12 is anticipated and included in the present disclosure, unless specifically excluded herein.

In some embodiments, fluidic body member 12 is fluidly coupled to at least one fluidic source system 14 to exert an increased fluid pressure within internal volume 16 to create the aforementioned pressure differential. Particularly, in some embodiments, the at least one fluidic source system 14 is configured to selectively introduce a working fluid to and/or remove a working fluid (i.e. liquid or gas) from the internal volume 16 of the fluidic body member 12.

The fluidic actuator system 10 further includes a plurality of auxetic elements 18, and in some embodiments one or more non-auxetic elements 20, arranged in a binding network 22 applied about at least a portion of the fluidic body member 12. As will be discussed herein, the binding network 22 of auxetic elements 18 and, in some embodiments, non-auxetic elements 20, is particularly configured to exert a negative Poisson's ratio physical response for improved design degrees of freedom. In some embodiments, the auxetic element 18 and/or non-auxetic element 20 is made of a shape memory alloy and/or polymer.

The fluidic actuator system 10 is configured to provide a soft, fluidic actuator that can produce a variety of unusual and/or unique shapes, motions, and/or responses. In some embodiments, fluidic actuator system 10 can find utility in a wide variety of applications, including but not limited to robotics, haptics, medical or assistive devices, elder care, ergonomics, and packaging.

In some embodiments, fluidic body member 12 defines a generally enclosed structure having internal volume 16. It should be understood that in some embodiments fluidic body member 12 comprises a combined input and output 24 to permit the introduction and/or removal of the working fluid from internal volume 16. However, in some embodiments, fluidic body member 12 can comprise one or more discrete inputs 26 and one or more discrete outputs 28. It should also be understood that a plurality of inputs and outputs can be used within a single fluidic actuator system 10.

In some embodiments, fluidic body member 12 is made of an elastic deformable material that is configured to expand in volume in response to an increased pressure differential existing between an internal pressure and an external pressure (such as relating to ambient or environmental pressure). In this way, it should be understood that an increased pressure differential between the internal pressure and the external pressure can occur via introduction of pressurized fluid within fluidic body member 12 and/or a decrease in pressure external to fluidic body member 12, such as but not limited to that which can occur as a result of change in altitude, barometric pressure, and the like In some embodiments, fluidic body member 12 can be made of an inextensible material that prevents or inhibits stretching, yet is foldable or is otherwise shaped to assume a reduced internal volume at a first or lower internal pressure that expands in volume in response to a second or increased internal pressure. It should be understood that fluidic body member 12 is sized and/or shaped to fit within at least a portion of the binding network 22 such that when fluidic body member 12 is in the first size it does not exert a force sufficient to change a relaxed shape of the binding network 22.

In some embodiments, fluidic body member 12 is configured to change an external shape in response to internal pressure of the working fluid. That is, introduction of the working fluidic into the internal volume 16 of the fluidic body member 12 results in an increase in internal pressure within the fluidic body member 12. This increase in internal pressure results in a change in the exterior shape of the fluidic body member 12 from the first size to the second size, which is sufficient to exert a force upon the binding network 22.

As described herein, binding network 22 can comprise one or more auxetic elements 18 and, in some embodiments, non-auxetic elements 20 to provide improved design degrees of freedom. In some embodiments, a plurality of auxetic elements 20 can be used having identical and/or, in some embodiments, different parameters patterned at different loci on a single binding network 22. However, it should be understood that additional binding networks 22 can be used in combination, such as arranged in series, parallel, discrete, or overlapping to provide a desired effect. For example, in some embodiments and configurations, fluidic actuator system 10 is operable to provide passive and/or sequential motion of a distal end of fluidic body member 12 or other tip member.

Most materials, when stretched in one direction, compress in directions orthogonal to the stretch. Similarly, most materials when compressed in one direction often expand in the orthogonal directions. The Poisson's ratio, u, of a material defines the relative compression in a material orthogonal to an imposed stretch (or, a material's relative expansion orthogonal to an imposed compression). However, auxetic materials, such as auxetic members 18, and structures, such as binding networks 22, behave differently: expansion in one direction causes expansion in the orthogonal directions, and compression in one direction causes compression in the orthogonal directions. The Poisson's ratio of auxetic materials and structures is thus negative.

Figure 1:
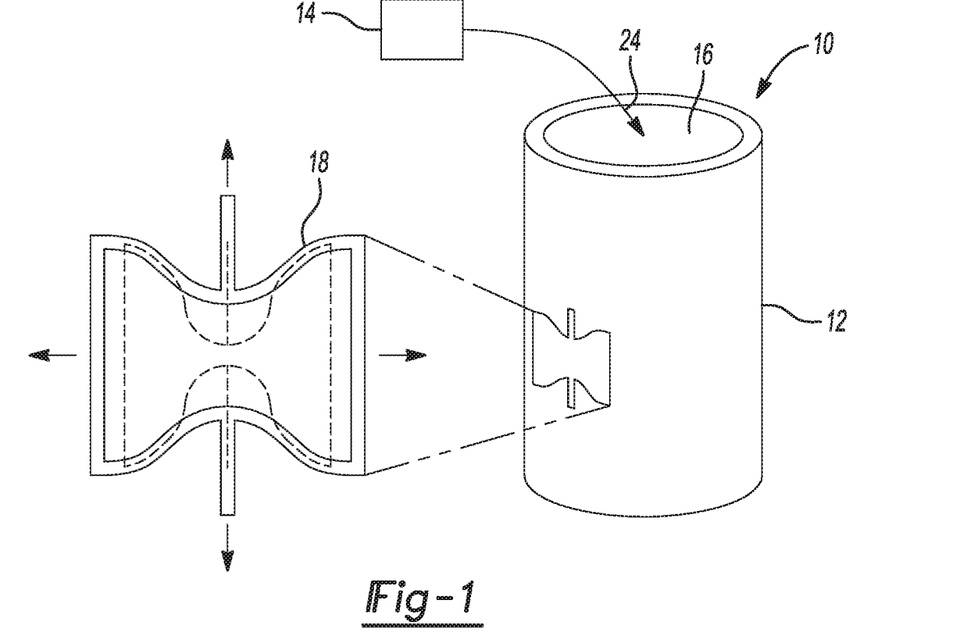
FIG. 1 is a perspective view illustrating an actuator system according to the principles of the present teachings having a hyper- or highly-elastic enclosure, auxetic reinforcement, and working fluid inlet.
Figure 2:
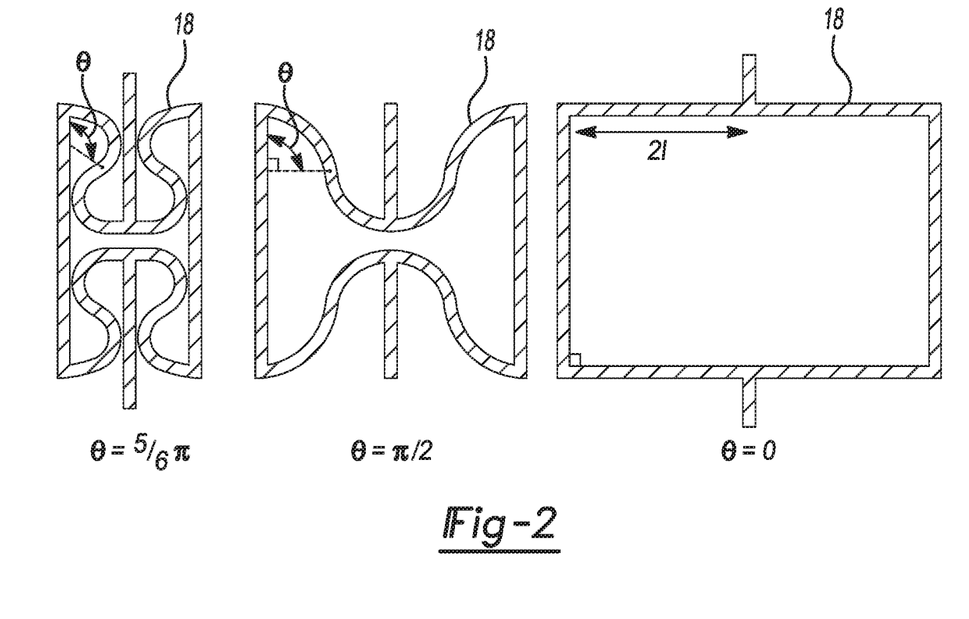
FIG. 2 is a schematic view illustrating a repeated auxetic element according to the principles of the present teachings.
Figures 3, 4:
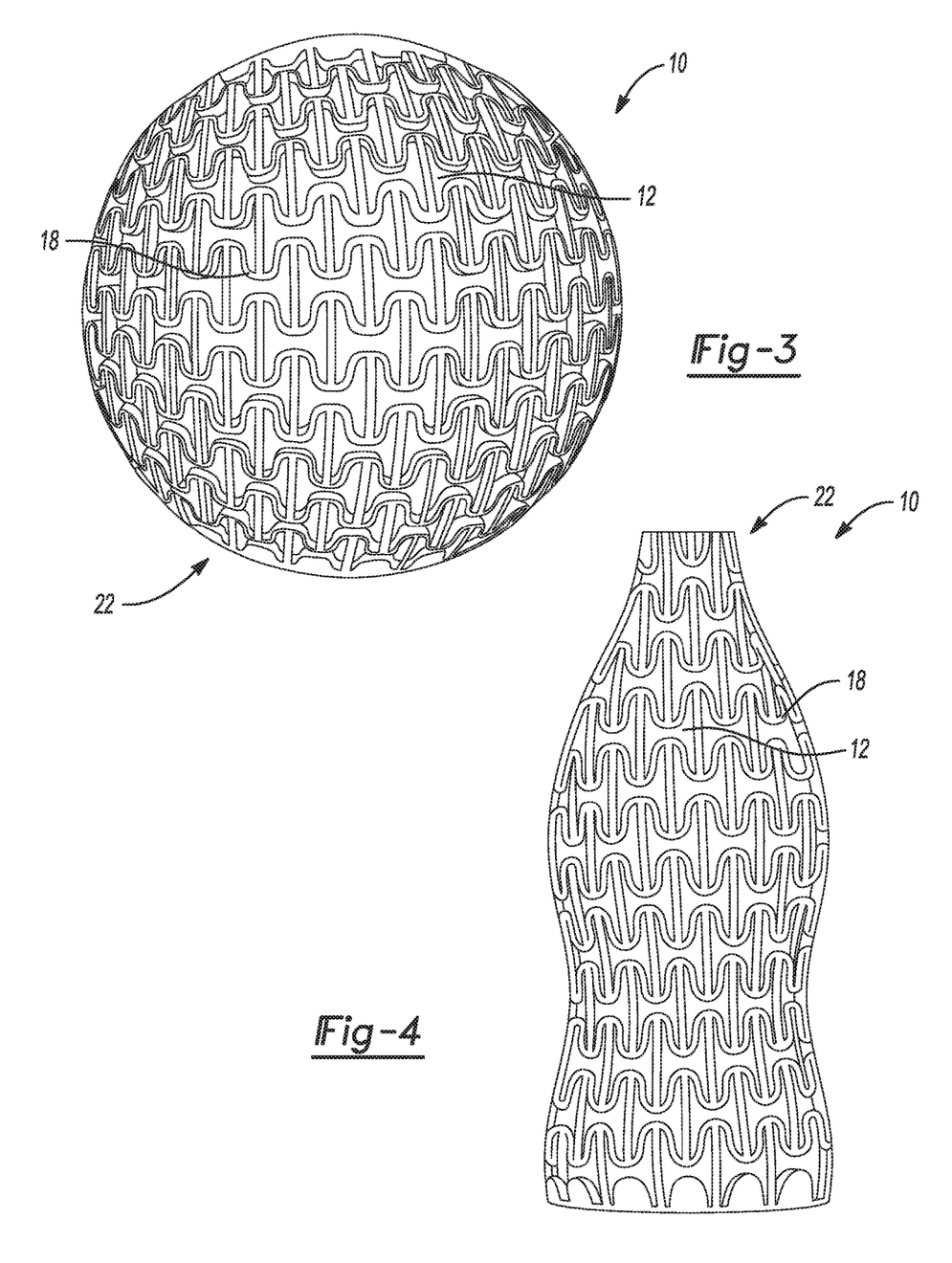
FIG. 3 is a perspective view illustrating a ball having an auxetic pattern applied externally according to the principles of the present teachings.
FIG. 4 is a perspective view illustrating a bottle having an auxetic pattern applied externally according to the principles of the present teachings.
Figure 5:
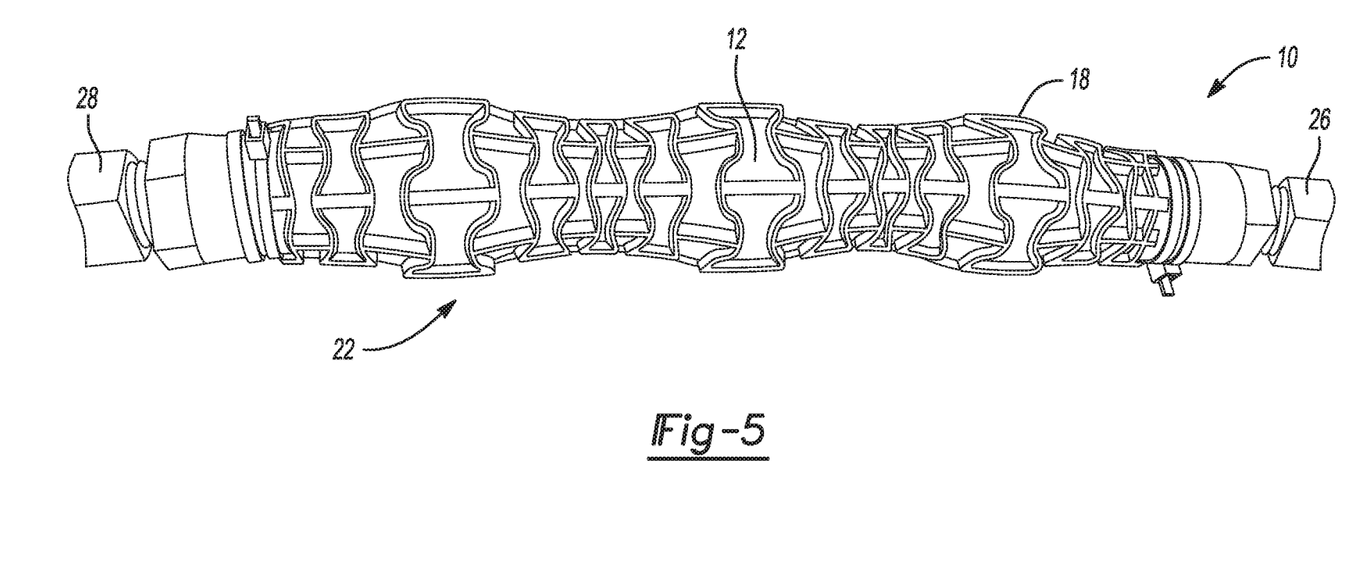
FIG. 5 is a perspective view illustrating auxetic elements with different design parameters combined into one pattern, causing a bulging shape when air-pressurized.
Figure 6A:
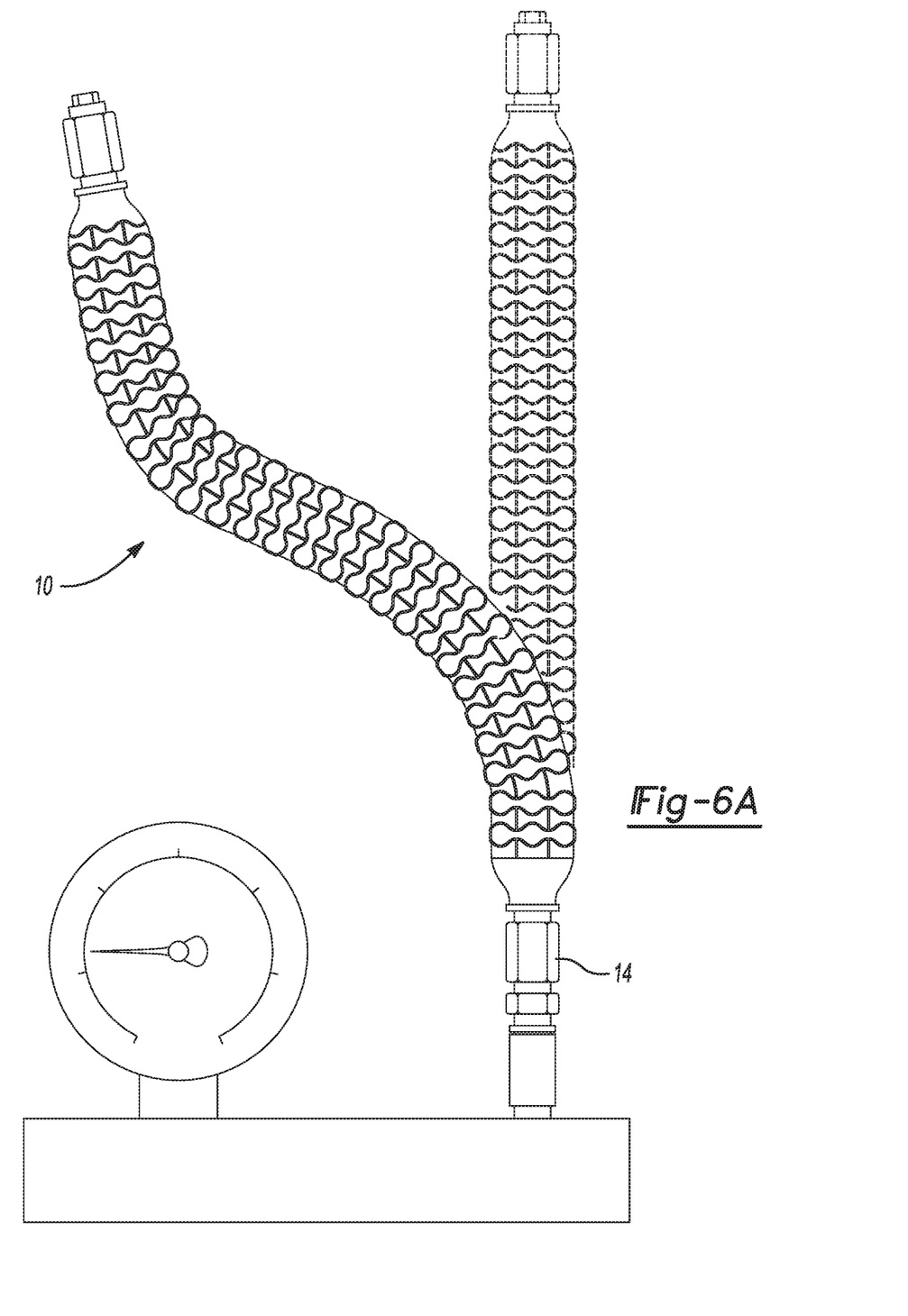
FIG. 6A is a perspective view illustrating auxetic elements combined with non-auxetic elements on the external surface, resulting in a straight or generally straight configuration at a first pressure (low pressure).
Figure 6B:
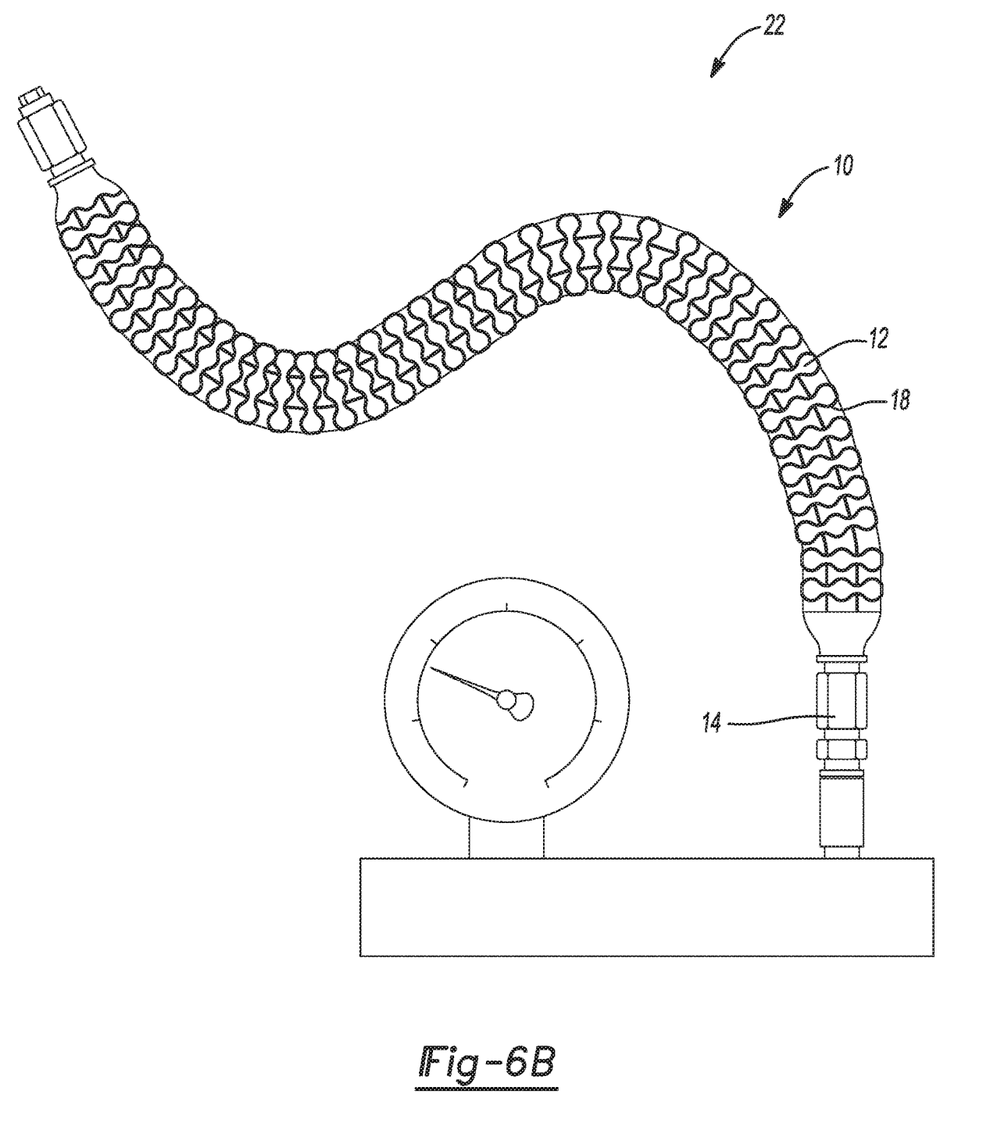
FIG. 6B is a perspective view illustrating auxetic elements combined with non-auxetic elements on the external surface, causing a bent 'S' shape, at a second pressure (higher pressure).
Figure 7:
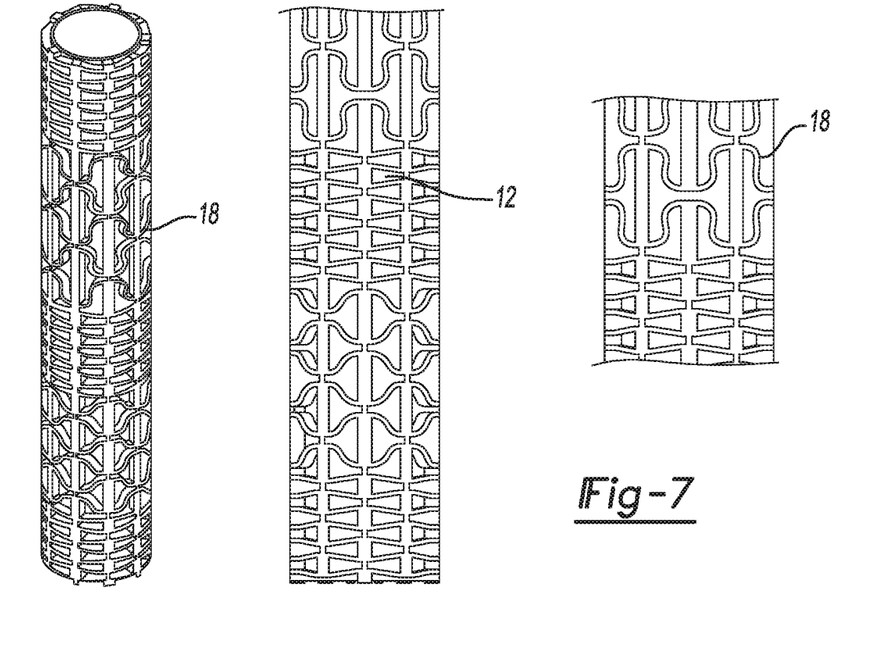
FIG. 7 is a tubular, varied auxetic pattern showing the action of the working fluid.
Figure 8:
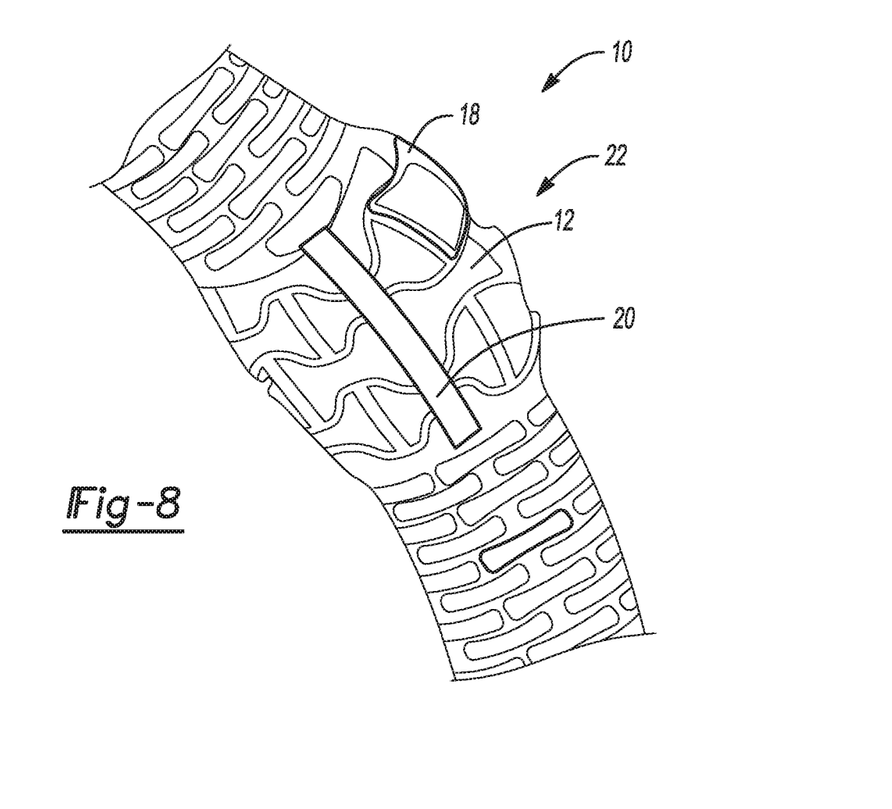
FIG. 8 is a perspective view illustrating a soft actuator embodiment of the actuator system according to the principles of the present teachings.
Figures 9, 10:
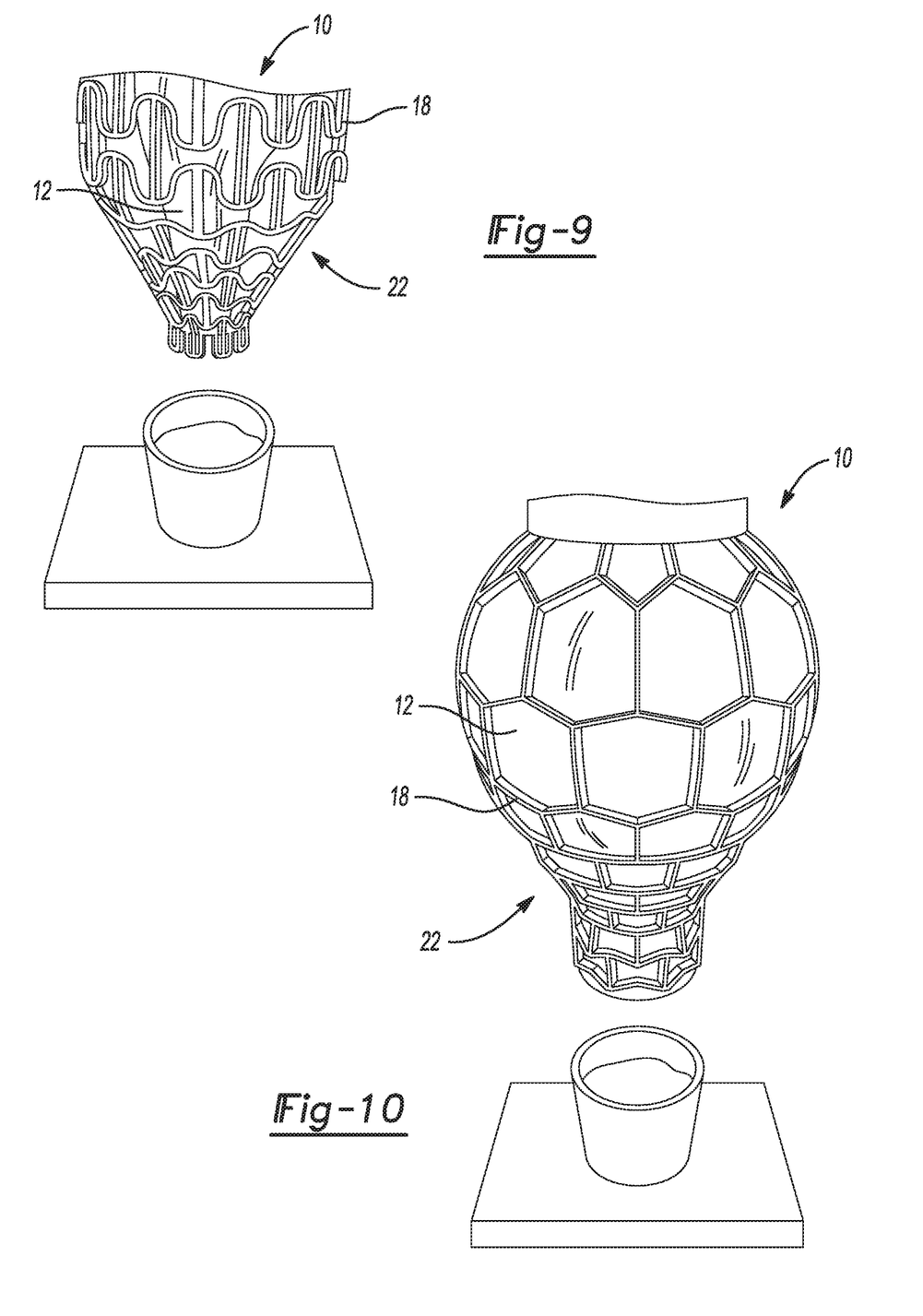
FIG. 9 is a perspective view illustrating a soft valve and bladder embodiment of the actuator system according to the principles of the present teachings at atmospheric pressure.
FIG. 10 is a perspective view illustrating the soft valve and bladder embodiment of the actuator system according to the principles of the present teachings at higher pressure relative to FIG. 9.

Therefore, in accordance with the present teachings, these auxetic properties can be harnessed to achieve the desired motion of fluidic actuator system 10. In some embodiments, one or more repeating auxetic elements 18 may be used, as illustrated in FIG. 2, that differ in design parameters ⊖ and I. Depending on the values of these parameters, the magnitude of the negative Poisson's ratio of the auxetic element 18 might be arbitrarily high or low. Further, because of the curved beam structure of such auxetic elements 18, the compliance may be distributed generally evenly and thus it can undergo large deformations without becoming locally overstrained.

In some embodiments, versions of auxetic element 18 having different design parameters can be combined. In some embodiments, auxetic elements 18 can be combined with non-auxetic elements 20, for local variance of the Poisson's ratio along different portions or discrete parts of fluidic body member 12. This local variance means that parts of the same fluidic actuator system 10 may expand, contract, or otherwise reshape relative to other parts. The result is that with this novel scheme one can create unique actuator shapes with form factors that vary drastically when working fluid is added. Potential uses for these actuator systems 10 include structures that deploy from a compressed state to an active state characterized by a larger shape, valves that change from a pinched configuration to one that allows fluid to flow under specified conditions, and/or a large variety of soft robotic devices including shape-adaptive surfaces.

As indicated above and with particular reference to FIGS. 9-12, in some embodiments, fluidic actuator system 10 can be configured as a valve that changes from a pinched or closed configuration that prevents or inhibits fluid flow to an opened configuration that permits such fluid flow. Particularly, as illustrated in the figures, fluidic body member 12 can be configured to be inflated to form localized expansion regions. In other words, fluidic body member 12 can be expanded in a non-uniform configuration such that portions thereof expand at a greater rate and/or to a greater degree than other portions. Such enlarged portions may thus act as fluid reservoirs, while the non-enlarged (i.e. those portions that have not expanded or expanded to a lesser degree than the enlarged portions due to the binding network 22) may act as a stopper or flow inhibitor. Accordingly, upon introduction of additional fluid within fluidic body member 12, the enlarged portions of fluidic body member 12 will first expand until a critical pressure differential is achieved. This pressure differential can include the previously described pressure differential between the internal volume of the fluidic body member 12 and the external pressure, or can include a pressure difference between adjacent sections of fluidic body member 12 thereby permitting a valve type response to the release of fluid. That is, once a predetermined pressure within fluidic body member 12 is reached, the non-enlarged or tapered portions of fluidic body member 12 can begin to enlarge thereby releasing internal fluid and acting as an auxetic valve.

Figure 11:
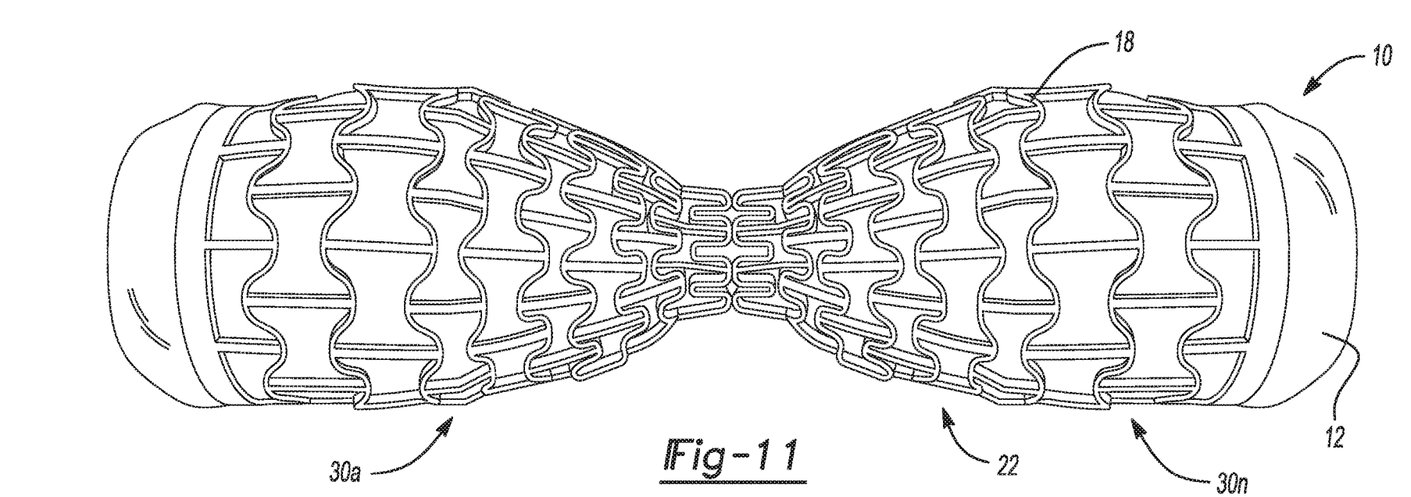
FIG. 11 is a perspective view illustrating the fluidic actuator system having discrete sections operable as a valve system in an inflated configuration.
Figure 12:
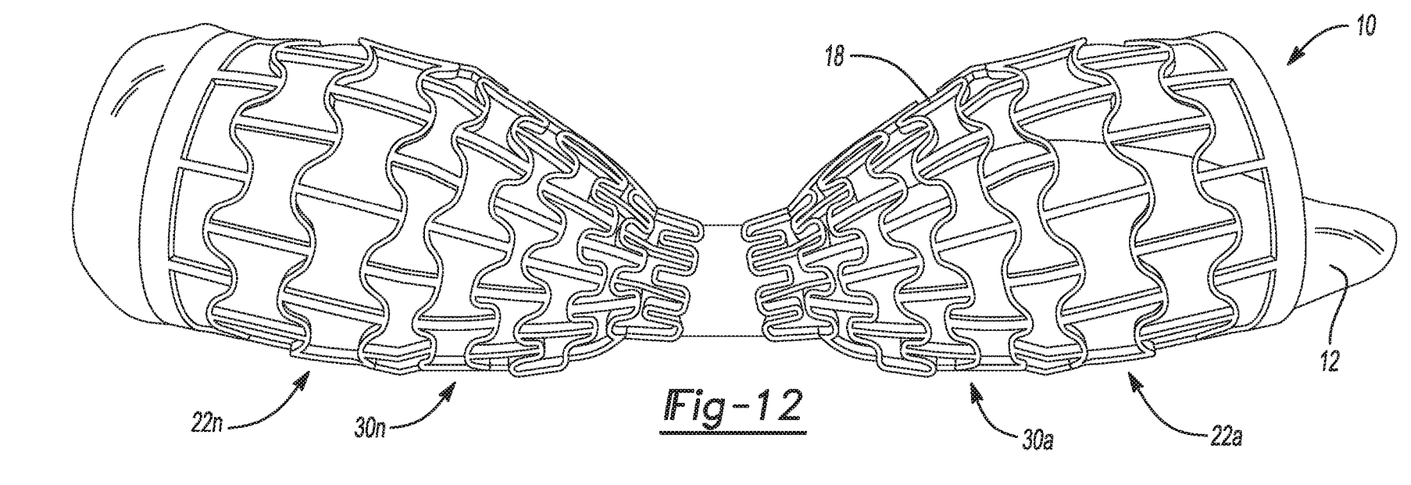
FIG. 12 is a perspective view illustrating the fluidic actuator system having discrete sections operable as a valve system in a deflated configuration.
Figure 13:
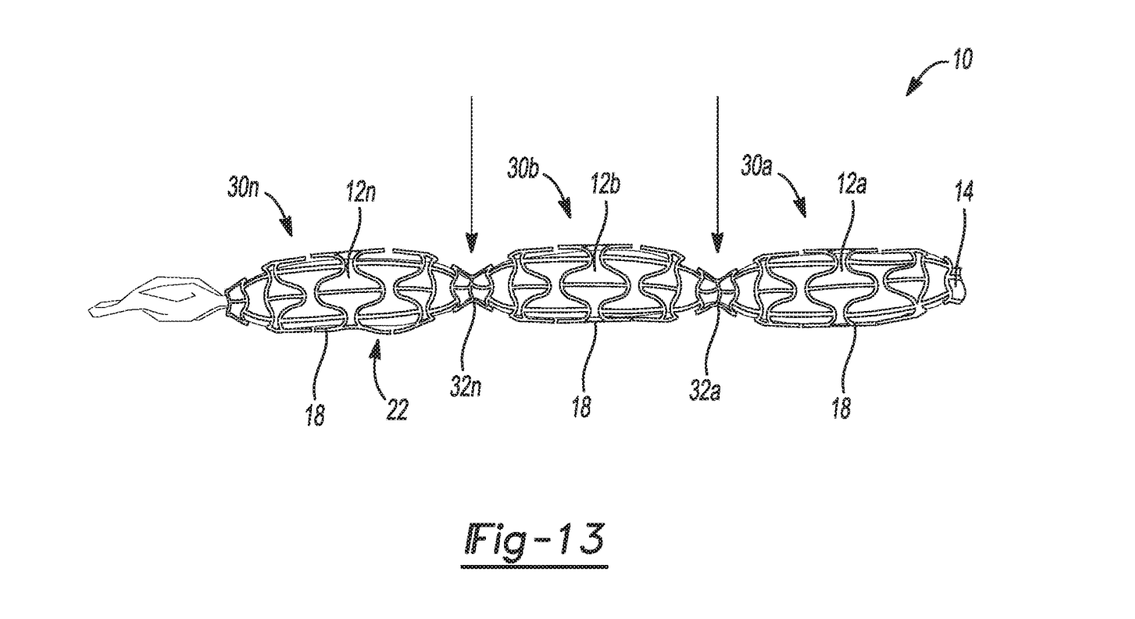
FIG. 13 is a perspective view illustrating the fluidic actuator system having discrete sections and compliant constraint sections.
Figure 14:
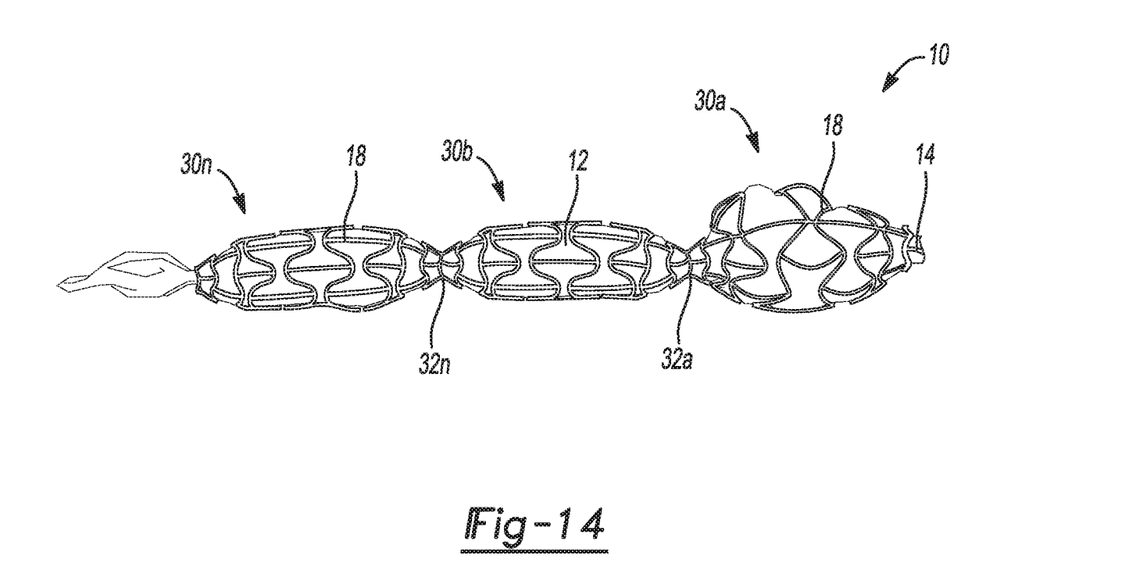
FIG. 14 is a perspective view illustrating the fluidic actuator system having discrete sections and compliant constraint sections having a first discrete section inflated.
Figure 15:
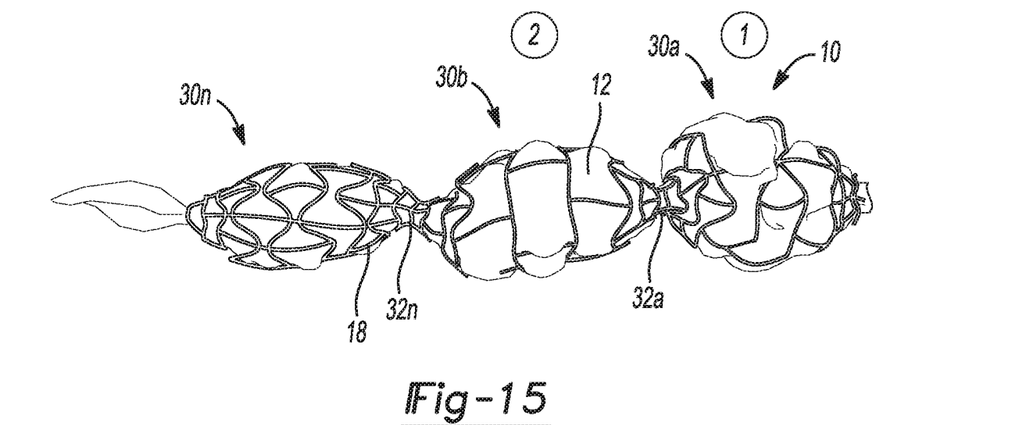
FIG. 15 is a perspective view illustrating the fluidic actuator system having discrete sections and compliant constraint sections having the first and second discrete sections inflated.
Figure 16:
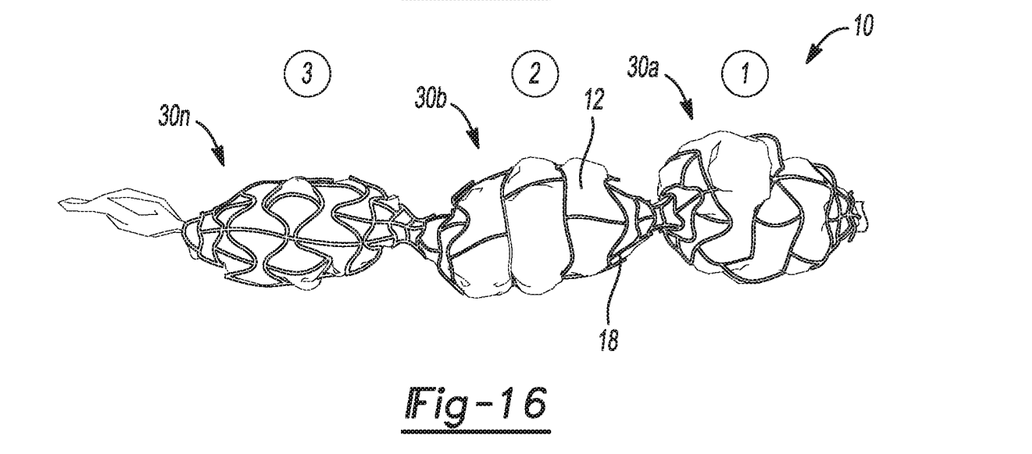
FIG. 16 is a perspective view illustrating the fluidic actuator system having discrete sections and compliant constraint sections having the first, second, and third discrete sections inflated.
Figure 17:
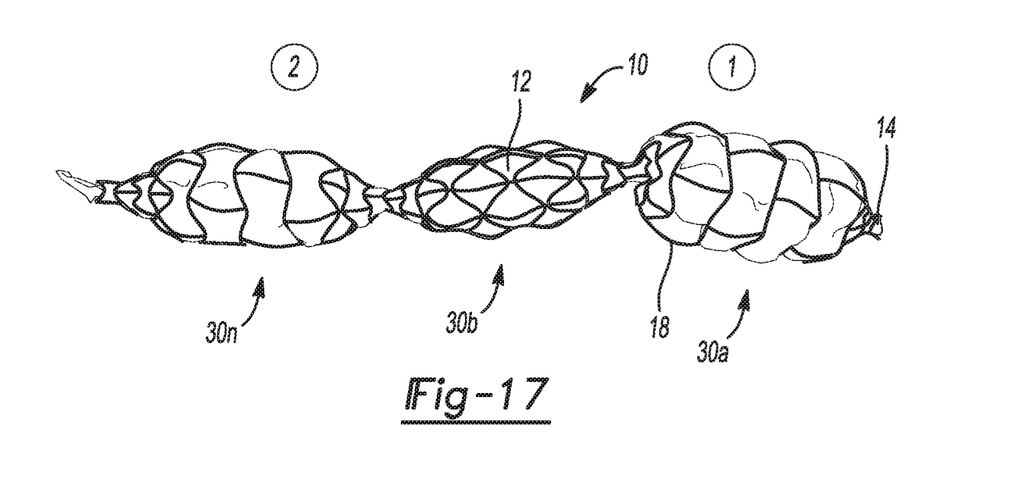
FIG. 17 is a perspective view illustrating the fluidic actuator system having discrete sections and compliant constraint sections having the first and second discrete sections inflated and the second discrete section deflated or not yet inflated.
Figure 18:
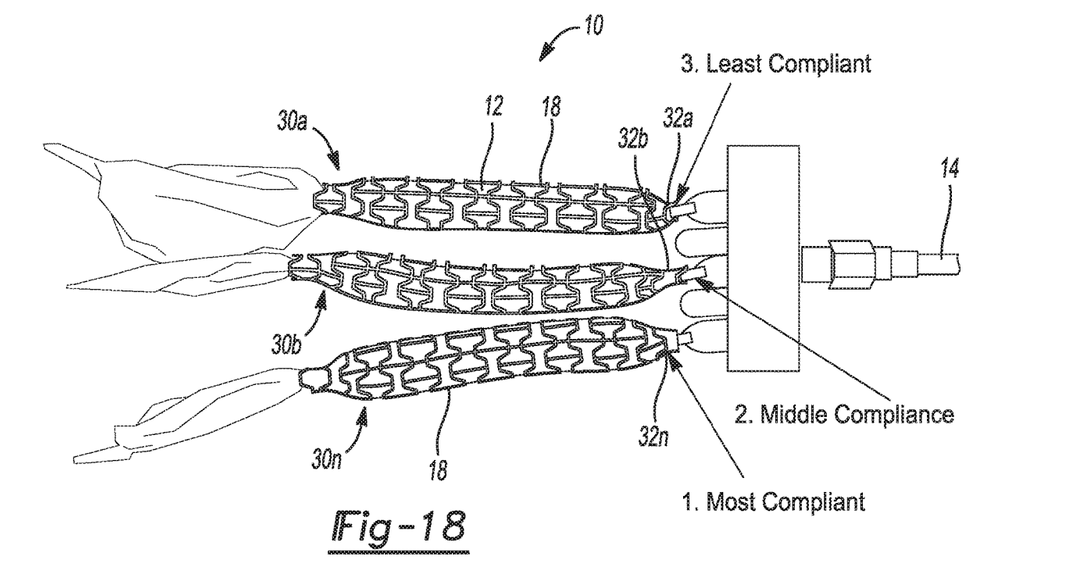
FIG. 18 is a perspective view illustrating the fluidic actuator system having discrete sections and compliant constraint sections arranged in parallel.
Figure 19:
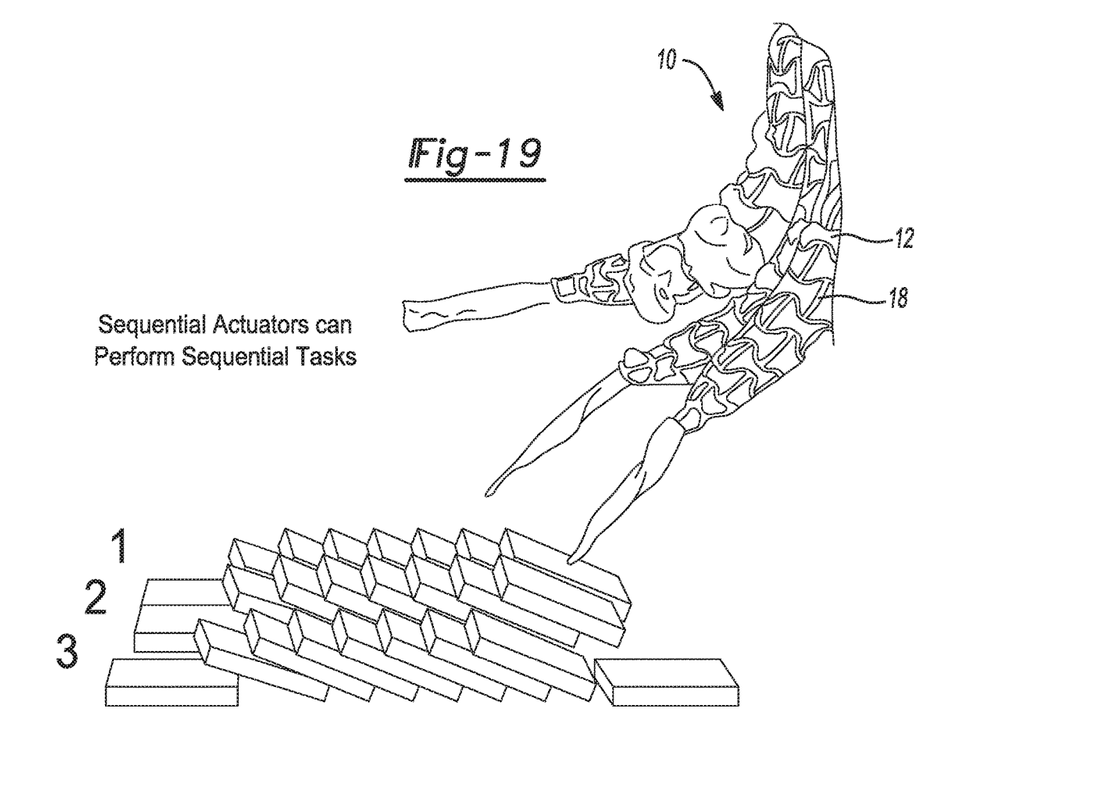
FIG. 19 is a perspective view illustrating the fluidic actuator system having discrete sections and compliant constraint sections of FIG. 18 actuated sequentially.

It should be understood, as illustrated in FIGS. 11 and 12, in some embodiments the auxetic valves can be arranged in series. Potential uses of this auxetic valve device include teleoperation of surgical procedures, such as by deploying such a valve inside the human body with a remote line of pressure, and then actuating it at an operating site; exploratory mechanisms (e.g. pipe crawling robots); home or environmental devices (e.g. a rain collector that releases water into the ground at a known rate once a certain level of rainfall is achieved); as controlling valves for soft robotic manipulators (which may be useful in manufacturing applications and agriculture); and as cleaning and inspection mechanisms for complicated machinery (e.g. aerospace machines).

Additionally, in some embodiments, fluidic actuator system 10 is configured to include a plurality of discrete sections 30a, 30b, 30n, wherein each discrete section 30a, 30b, 30n comprises fluidic body member 12 disposed within a corresponding binding network 22. It should be understood that in some embodiments, a plurality of fluidic body members 12a, 12b, 12n can be used with a single binding network 22 or a plurality of binding networks 22a, 22b, 22n or vice versa. These arrangements enable sequential inflation and/or actuation of each discrete section 30a, 30b, 30n. It should be understood that such inflation and/or actuation can occur in various patterns as dictated by the corresponding auxetic parameters at each location of binding network 22 or networks 22a, 22b, 22n.

As illustrated in FIG. 13-19, in some embodiments, fluidic actuator system 10 is configured to include a plurality of discrete sections 30a, 30b, 30n. In some embodiments, each discrete section 30a, 30b, 30n comprises a single fluidic body member 12 being fluidly coupled to a single fluid source system 14; however, it should be understood that fluid source system 14 is optional and the present teachings can be responsive to the aforementioned pressure differential. The single fluidic body member 12 can be disposed within a corresponding binding network 22a, 22b, 22n as illustrated in FIGS. 13-17. Between adjacent discrete sections 30a, 30b, and 30n is a compliant constraint section 32a, 32n. As should be understood, the compliancy of each constraint section 32a, 32n can be configured to permit a sequential filling and expansion of each discreet section 30a, 30b, 30n thereby resulting in localized deformation, actuation, and/or response of fluidic actuator system 10. It should also be understood that compliant constraint sections 32a, 32n and/or binding networks 22a, 22b, 22n can be relatively configured to achieve a cascading, sequential inflation response (see FIGS. 13-16) or can be configured to achieve a non-cascading, non-sequential inflation response (i.e. a first, a last, and then a middle section inflation) (see FIG. 17). To this end, the relative compliancy of each compliant constraint section 32a, 32n can vary relative to each other and, likewise, the relative expandability of each binding networks 22a, 22b, 22n can vary relative to each other. To this end, the relative compliance of each compliant constraint section 32a, 32n can be leveraged to result in useful, passive motion. That is, in embodiments of fluidic actuator system 10 having discrete sections 30a, 30b, 30n disposed in parallel to each other and each being coupled to a single fluid source system 14 along a separate compliant constraint section 32a, 32b, 32n, the relative compliancy of the compliant constraint sections 32a, 32b, 32n can be varied to encourage each of the discrete sections 30a, 30b, 30n to inflate and thus move independently to perform sequential tasks (see FIGS. 18 and 19).

These embodiments may be particularly useful in connection with valves (in particular, it would allow the creation of valves that are compact and do not require internal components), surgery (especially minimally invasive surgery where complicated motions are required), assembly of mechanical components, picking fruit, catching and manipulating small compliant objects (e.g. insects, biotissues), and placing objects into complicated packaging.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An actuator system comprising:
   a first fluidic body member having a surface configured to deform predictably from a first configuration to a second configuration in response to a pressure differential between an internal volume pressure and an external pressure; and
   a first binding network of beam elements having at least one auxetic element, the beam elements having varying stiffness, the first binding network of beam elements being disposed on and engaging the surface of the first fluidic body member in at least the second configuration, the first binding network of beam elements configured to constrain movement of the first fluidic body member during deformation of the first fluidic body member from the first configuration to the second configuration thereby resulting in a predictable change in shape or effective rigidity of the first fluidic body member,
   wherein at least one of the first fluidic body member and the first binding network comprises a plurality of discrete sections, each of the plurality of discrete sections is configured to result in deformation in at least one of the plurality of discrete sections in response to change in the pressure differential.

2. The actuator system according to claim 1, wherein the first binding network of beam elements is configured to constrain movement of the first fluidic body member during deformation of the first fluidic body member from the first configuration to the second configuration thereby resulting in at least one of planar and 3-dimensional kinematic shapes and motions in the first fluidic body member.

3. The actuator system according to claim 1, wherein at least one beam element of the first binding network is configured to be spaced apart from the surface of the fluidic member in the first configuration.

4. The actuator system according to claim 3, wherein the at least one beam element of the first binding network that is configured to be spaced apart from the surface of the fluidic member in the first configuration is configured to contact the surface of the fluidic member in the second configuration.

5. The actuator system according to claim 1 wherein each of the plurality of discrete sections is configured to result in sequential deformation in a cascading order among the plurality of discrete sections in response to change in the pressure differential.

6. The actuator system according to claim 1 wherein each of the plurality of discrete sections is configured to result in deformation in a non-cascading order among the plurality of discrete sections in response to change in the pressure differential.

7. The actuator system according to claim 1 wherein each of the plurality of discrete sections is separated by a compliant constraint section, at least one of the plurality of discrete sections and the compliant constraint section is configured to result in localized deformation of the first fluidic body member in response to change in the pressure differential.

8. The actuator system according to claim 1 wherein each of the plurality of discrete sections is separated by a compliant constraint section, at least one of the plurality of discrete sections and the compliant constraint section is configured to selectively release pressure within the first fluidic body member in response to the pressure differential or a pressure difference between discrete sections.

9. The actuator system according to claim 1 wherein the first fluidic body member is an enclosed body.

10. The actuator system according to claim 1 wherein the at least one auxetic element comprises a plurality of auxetic elements.

11. The actuator system according to claim 10, wherein the first binding network of beam elements comprising a plurality of non-auxetic elements cooperating with the plurality of auxetic elements.

12. The actuator system according to claim 1 wherein the at least one auxetic element is disposed on and engaging an external side of the surface of the first fluidic body member.

13. An actuator system comprising:
a first fluidic body member having a surface configured to deform predictably from a first configuration to a second configuration in response to a pressure differential between an internal volume pressure and an external pressure; and
a first binding network of beam elements having at least one auxetic element, the beam elements having varying stiffness, the first binding network of beam elements being disposed on and engaging the surface of the first fluidic body member in at least the second configuration, the first binding network of beam elements configured to constrain movement of the first fluidic body member during deformation of the first fluidic body member from the first configuration to the second configuration thereby resulting in a predictable change in shape or effective rigidity of the first fluidic body member,
wherein a topology and size of the beam elements is configured to be varied to generate desired planar or spatial kinematic shapes and motions of the first fluidic body member.

14. The actuator system according to claim 1, further comprising:
a second fluidic body member having a surface configured to deform predictably from a first configuration to a second configuration in response to a pressure differential between an internal volume pressure of the second fluidic body member and the external pressure; and
a second binding network of beam elements having at least one auxetic element, the second binding network of beam elements being disposed on and engaging the surface of the second fluidic body member in at least the second configuration, the second binding network of beam elements configured to constrain movement of the second fluidic body member during deformation of the second fluidic body member from the first configuration to the second configuration thereby resulting in a predictable change in shape or effective rigidity of the second fluidic body member.

15. An actuator system comprising:
a first fluidic body member having a surface configured to deform predictably from a first configuration to a second configuration in response to a pressure differential between an internal volume pressure and an external pressure;
a first binding network of beam elements having at least one auxetic element, the beam elements having varying stiffness, the first binding network of beam elements being disposed on and engaging the surface of the first fluidic body member in at least the second configuration, the first binding network of beam elements configured to constrain movement of the first fluidic body member during deformation of the first fluidic body member from the first configuration to the second configuration thereby resulting in a predictable change in shape or effective rigidity of the first fluidic body member;
a second fluidic body member having a surface configured to deform predictably from a first configuration to a second configuration in response to a pressure differential between an internal volume pressure of the second fluidic body member and the external pressure; and
a second binding network of beam elements having at least one auxetic element, the second binding network of beam elements being disposed on and engaging the surface of the second fluidic body member in at least the second configuration, the second binding network of beam elements configured to constrain movement of the second fluidic body member during deformation of the second fluidic body member from the first configuration to the second configuration thereby resulting in a predictable change in shape or effective rigidity of the second fluidic body member,
wherein the first fluidic body member and the second fluidic body member are operably coupled in parallel.

16. An actuator system comprising:
a first fluidic body member having a surface configured to deform predictably from a first configuration to a second configuration in response to a pressure differential between an internal volume pressure and an external pressure;
a first binding network of beam elements having at least one auxetic element, the beam elements having varying stiffness, the first binding network of beam elements being disposed on and engaging the surface of the first fluidic body member in at least the second configuration, the first binding network of beam elements configured to constrain movement of the first fluidic body member during deformation of the first fluidic body member from the first configuration to the second configuration thereby resulting in a predictable change in shape or effective rigidity of the first fluidic body member;
a second fluidic body member having a surface configured to deform predictably from a first configuration to a second configuration in response to a pressure differential between an internal volume pressure of the second fluidic body member and the external pressure; and
a second binding network of beam elements having at least one auxetic element, the second binding network of beam elements being disposed on and engaging the surface of the second fluidic body member in at least the second configuration, the second binding network of beam elements configured to constrain movement of the second fluidic body member during deformation of the second fluidic body member from the first configuration to the second configuration thereby resulting in a predictable change in shape or effective rigidity of the second fluidic body member,
wherein the first fluidic body member and the second fluidic body member are operably coupled in series.

17. An actuator system comprising:
a first fluidic body member having a surface configured to deform predictably from a first configuration to a second configuration in response to a pressure differential between an internal volume pressure and an external pressure; and
a first binding network of beam elements having at least one auxetic element, the beam elements having varying stiffness, the first binding network of beam elements being disposed on and engaging the surface of the first fluidic body member in at least the second configuration, the first binding network of beam elements configured to constrain movement of the first fluidic body member during deformation of the first fluidic body member from the first configuration to the second configuration thereby resulting in a predictable change in shape or effective rigidity of the first fluidic body member, wherein at least one beam element comprises a shape memory alloy.

18. An actuator system comprising:

a first fluidic body member having a surface configured to deform predictably from a first configuration to a second configuration in response to a pressure differential between an internal volume pressure and an external pressure; and a first binding network of beam elements having at least one auxetic element, the beam elements having varying stiffness, the first binding network of beam elements being disposed on and engaging the surface of the first fluidic body member in at least the second configuration, the first binding network of beam elements configured to constrain movement of the first fluidic body member during deformation of the first fluidic body member from the first configuration to the second configuration thereby resulting in a predictable change in shape or effective rigidity of the first fluidic body member, wherein at least one beam element comprises a shape memory polymer.

* * * * *